US011582046B2

(12) United States Patent
Lee et al.

(10) Patent No.: US 11,582,046 B2
(45) Date of Patent: *Feb. 14, 2023

(54) STORAGE SYSTEM COMMUNICATION

(71) Applicant: PURE STORAGE, INC., Mountain View, CA (US)

(72) Inventors: Robert Lee, San Carlos, CA (US); John Hayes, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/351,860

(22) Filed: Jun. 18, 2021

(65) Prior Publication Data

US 2021/0314173 A1 Oct. 7, 2021

Related U.S. Application Data

(63) Continuation of application No. 16/370,650, filed on Mar. 29, 2019, now Pat. No. 11,070,382, which is a (Continued)

(51) Int. Cl.
*G06F 12/14* (2006.01)
*H04L 9/32* (2006.01)
(Continued)

(52) U.S. Cl.
CPC .......... *H04L 9/3268* (2013.01); *G06F 3/0622* (2013.01); *G06F 3/0659* (2013.01); (Continued)

(58) Field of Classification Search
CPC .... G06F 3/0622; G06F 3/0659; G06F 3/0688; G06F 11/00; G06F 11/1612;
(Continued)

(56) References Cited

U.S. PATENT DOCUMENTS

| | | | |
|---|---|---|---|
| 5,390,327 | A | 2/1995 | Lubbers et al. |
| 5,450,581 | A | 9/1995 | Bergen et al. |

(Continued)

FOREIGN PATENT DOCUMENTS

| | | |
|---|---|---|
| EP | 2164006 | 3/2010 |
| EP | 2256621 | 12/2010 |

(Continued)

OTHER PUBLICATIONS

Hwang, Kai, et al. "RAID-x: A New Distributed Disk Array for I/O-Centric Cluster Computing," HPDC '00 Proceedings of the 9th IEEE International Symposium on High Performance Distributed Computing, IEEE, 2000, pp. 279-286.

(Continued)

*Primary Examiner* — Hiep T Nguyen
(74) *Attorney, Agent, or Firm* — Womble Bond Dickinson (US) LLP

(57) ABSTRACT

A method for authorizing I/O (input/output) commands in a storage cluster is provided. The method includes generating a token responsive to an authority initiating an I/O command, wherein the token is specific to assignment of the authority and a storage node of the storage cluster. The method includes verifying the I/O command using the token, wherein the token includes a signature confirming validity of the token and wherein the token is revocable.

20 Claims, 7 Drawing Sheets

Related U.S. Application Data continuation of application No. 15/808,438, filed on Nov. 9, 2017, now Pat. No. 10,277,408, which is a continuation of application No. 14/921,871, filed on Oct. 23, 2015, now Pat. No. 9,843,453.

(51) Int. Cl.

| | |
|---|---|
| ***H04L 9/08*** | (2006.01) |
| ***G06F 11/00*** | (2006.01) |
| ***G06F 11/16*** | (2006.01) |
| ***G06F 3/06*** | (2006.01) |
| ***G06F 21/40*** | (2013.01) |

(52) U.S. Cl.

CPC ............ *G06F 3/0688* (2013.01); *G06F 11/00* (2013.01); *G06F 11/1612* (2013.01); *G06F 12/1458* (2013.01); *G06F 21/40* (2013.01); *H04L 9/0891* (2013.01); *H04L 9/0894* (2013.01); *H04L 9/3213* (2013.01); *H04L 9/3247* (2013.01); *G06F 2212/1052* (2013.01)

(58) Field of Classification Search

CPC ............. G06F 11/1425; G06F 12/1458; G06F 2212/1052; G06F 2201/83; G06F 21/40; H04L 9/3268; H04L 9/0891; H04L 9/0894; H04L 9/3213; H04L 9/3247

See application file for complete search history.

(56) References Cited

U.S. PATENT DOCUMENTS

| | | | |
|---|---|---|---|
| 5,479,653 | A | 12/1995 | Jones |
| 5,488,731 | A | 1/1996 | Mendelsohn |
| 5,504,858 | A | 4/1996 | Ellis et al. |
| 5,564,113 | A | 10/1996 | Bergen et al. |
| 5,574,882 | A | 11/1996 | Menon et al. |
| 5,649,093 | A | 7/1997 | Hanko et al. |
| 5,883,909 | A | 3/1999 | Dekoning et al. |
| 6,000,010 | A | 12/1999 | Legg |
| 6,260,156 | B1 | 7/2001 | Garvin et al. |
| 6,269,453 | B1 | 7/2001 | Krantz |
| 6,275,898 | B1 | 8/2001 | DeKoning |
| 6,453,428 | B1 | 9/2002 | Stephenson |
| 6,523,087 | B2 | 2/2003 | Busser |
| 6,535,417 | B2 | 3/2003 | Tsuda |
| 6,643,748 | B1 | 11/2003 | Wieland |
| 6,725,392 | B1 | 4/2004 | Frey et al. |
| 6,763,455 | B2 | 7/2004 | Hall |
| 6,836,816 | B2 | 12/2004 | Kendall |
| 6,985,995 | B2 | 1/2006 | Holland et al. |
| 7,032,125 | B2 | 4/2006 | Holt et al. |
| 7,047,358 | B2 | 5/2006 | Lee et al. |
| 7,051,155 | B2 | 5/2006 | Talagala et al. |
| 7,055,058 | B2 | 5/2006 | Lee et al. |
| 7,065,617 | B2 | 6/2006 | Wang |
| 7,069,383 | B2 | 6/2006 | Yamamoto et al. |
| 7,076,606 | B2 | 7/2006 | Orsley |
| 7,107,480 | B1 | 9/2006 | Moshayedi et al. |
| 7,159,150 | B2 | 1/2007 | Kenchammana-Hosekote et al. |
| 7,162,575 | B2 | 1/2007 | Dalal et al. |
| 7,164,608 | B2 | 1/2007 | Lee |
| 7,188,270 | B1 | 3/2007 | Nanda et al. |
| 7,334,156 | B2 | 2/2008 | Land et al. |
| 7,370,220 | B1 | 5/2008 | Nguyen et al. |
| 7,386,666 | B1 | 6/2008 | Beauchamp et al. |
| 7,398,285 | B2 | 7/2008 | Kisley |
| 7,424,498 | B1 | 9/2008 | Patterson |
| 7,424,592 | B1 | 9/2008 | Karr |
| 7,444,532 | B2 | 10/2008 | Masuyama et al. |
| 7,480,658 | B2 | 1/2009 | Heinla et al. |
| 7,484,056 | B2 | 1/2009 | Madnani et al. |
| 7,484,057 | B1 | 1/2009 | Madnani et al. |
| 7,484,059 | B1 | 1/2009 | Ofer et al. |
| 7,536,506 | B2 | 5/2009 | Ashmore et al. |
| 7,558,859 | B2 | 7/2009 | Kasiolas |
| 7,565,446 | B2 | 7/2009 | Talagala et al. |
| 7,613,947 | B1 | 11/2009 | Coatney |
| 7,634,617 | B2 | 12/2009 | Misra |
| 7,634,618 | B2 | 12/2009 | Misra |
| 7,681,104 | B1 | 3/2010 | Sim-Tang et al. |
| 7,681,105 | B1 | 3/2010 | Sim-Tang et al. |
| 7,681,109 | B2 | 3/2010 | Yang et al. |
| 7,730,257 | B2 | 6/2010 | Franklin |
| 7,730,258 | B1 | 6/2010 | Smith |
| 7,730,274 | B1 | 6/2010 | Usgaonkar |
| 7,743,276 | B2 | 6/2010 | Jacobsen et al. |
| 7,752,489 | B2 | 7/2010 | Deenadhayalan et al. |
| 7,757,038 | B2 | 7/2010 | Kitahara |
| 7,757,059 | B1 | 7/2010 | Ofer et al. |
| 7,778,960 | B1 | 8/2010 | Chatterjee et al. |
| 7,783,955 | B2 | 8/2010 | Haratsch et al. |
| 7,814,272 | B2 | 10/2010 | Barrall et al. |
| 7,814,273 | B2 | 10/2010 | Barrall |
| 7,818,531 | B2 | 10/2010 | Barrall |
| 7,827,351 | B2 | 11/2010 | Suetsugu et al. |
| 7,827,439 | B2 | 11/2010 | Matthew et al. |
| 7,831,768 | B2 | 11/2010 | Ananthamurthy et al. |
| 7,856,583 | B1 | 12/2010 | Smith |
| 7,870,105 | B2 | 1/2011 | Arakawa et al. |
| 7,873,878 | B2 | 1/2011 | Belluomini et al. |
| 7,885,938 | B1 | 2/2011 | Greene et al. |
| 7,886,111 | B2 | 2/2011 | Klemm et al. |
| 7,908,448 | B1 | 3/2011 | Chatterjee et al. |
| 7,916,538 | B2 | 3/2011 | Jeon et al. |
| 7,921,268 | B2 | 4/2011 | Jakob |
| 7,930,499 | B2 | 4/2011 | Duchesne |
| 7,941,697 | B2 | 5/2011 | Mathew et al. |
| 7,958,303 | B2 | 6/2011 | Shuster |
| 7,971,129 | B2 | 6/2011 | Watson |
| 7,984,016 | B2 | 7/2011 | Kisley |
| 7,991,822 | B2 | 8/2011 | Bish et al. |
| 8,006,126 | B2 | 8/2011 | Deenadhayalan et al. |
| 8,010,485 | B1 | 8/2011 | Chatterjee et al. |
| 8,010,829 | B1 | 8/2011 | Chatterjee et al. |
| 8,020,047 | B2 | 9/2011 | Courtney |
| 8,046,548 | B1 | 10/2011 | Chatterjee et al. |
| 8,051,361 | B2 | 11/2011 | Sim-Tang et al. |
| 8,051,362 | B2 | 11/2011 | Li et al. |
| 8,074,038 | B2 | 12/2011 | Lionetti et al. |
| 8,082,393 | B2 | 12/2011 | Galloway et al. |
| 8,086,603 | B2 | 12/2011 | Nasre et al. |
| 8,086,634 | B2 | 12/2011 | Mimatsu |
| 8,086,911 | B1 | 12/2011 | Taylor |
| 8,090,837 | B2 | 1/2012 | Shin et al. |
| 8,108,502 | B2 | 1/2012 | Tabbara et al. |
| 8,117,388 | B2 | 2/2012 | Jernigan, IV |
| 8,117,521 | B2 | 2/2012 | Yang et al. |
| 8,140,821 | B1 | 3/2012 | Raizen et al. |
| 8,145,838 | B1 | 3/2012 | Miller et al. |
| 8,145,840 | B2 | 3/2012 | Koul et al. |
| 8,175,012 | B2 | 5/2012 | Haratsch et al. |
| 8,176,360 | B2 | 5/2012 | Frost et al. |
| 8,176,405 | B2 | 5/2012 | Hafner et al. |
| 8,180,855 | B2 | 5/2012 | Aiello et al. |
| 8,200,922 | B2 | 6/2012 | McKean et al. |
| 8,209,469 | B2 | 6/2012 | Carpenter et al. |
| 8,225,006 | B1 | 7/2012 | Karamcheti |
| 8,239,618 | B2 | 8/2012 | Kotzur et al. |
| 8,244,999 | B1 | 8/2012 | Chatterjee et al. |
| 8,261,016 | B1 | 9/2012 | Goel |
| 8,271,455 | B2 | 9/2012 | Kesselman |
| 8,285,686 | B2 | 10/2012 | Kesselman |
| 8,305,811 | B2 | 11/2012 | Jeon |
| 8,315,999 | B2 | 11/2012 | Chatley et al. |
| 8,327,080 | B1 | 12/2012 | Der |
| 8,335,769 | B2 | 12/2012 | Kesselman |
| 8,341,118 | B2 | 12/2012 | Drobychev et al. |
| 8,351,290 | B1 | 1/2013 | Huang et al. |
| 8,364,920 | B1 | 1/2013 | Parkison et al. |
| 8,365,041 | B2 | 1/2013 | Chu et al. |
| 8,375,146 | B2 | 2/2013 | Sinclair |
| 8,397,016 | B2 | 3/2013 | Talagala et al. |
| 8,402,152 | B2 | 3/2013 | Duran |

(56) References Cited

U.S. PATENT DOCUMENTS

| | | | |
|---|---|---|---|
| 8,412,880 | B2 | 4/2013 | Leibowitz et al. |
| 8,423,739 | B2 | 4/2013 | Ash et al. |
| 8,429,436 | B2 | 4/2013 | Filingim et al. |
| 8,452,928 | B1 | 5/2013 | Ofer et al. |
| 8,473,698 | B2 | 6/2013 | Lionetti et al. |
| 8,473,778 | B2 | 6/2013 | Simitci |
| 8,473,815 | B2 | 6/2013 | Yu et al. |
| 8,479,037 | B1 | 7/2013 | Chatterjee et al. |
| 8,484,414 | B2 | 7/2013 | Sugimoto et al. |
| 8,498,967 | B1 | 7/2013 | Chatterjee et al. |
| 8,522,073 | B2 | 8/2013 | Cohen |
| 8,533,408 | B1 | 9/2013 | Madnani et al. |
| 8,533,527 | B2 | 9/2013 | Daikokuya et al. |
| 8,539,177 | B1 | 9/2013 | Ofer et al. |
| 8,544,029 | B2 | 9/2013 | Bakke et al. |
| 8,549,224 | B1 | 10/2013 | Zeryck et al. |
| 8,583,861 | B1 | 11/2013 | Ofer et al. |
| 8,589,625 | B2 | 11/2013 | Colgrove et al. |
| 8,595,455 | B2 | 11/2013 | Chatterjee et al. |
| 8,615,599 | B1 | 12/2013 | Takefman et al. |
| 8,627,136 | B2 | 1/2014 | Shankar et al. |
| 8,627,138 | B1 | 1/2014 | Clark |
| 8,639,669 | B1 | 1/2014 | Douglis et al. |
| 8,639,863 | B1 | 1/2014 | Kanapathippillai et al. |
| 8,640,000 | B1 | 1/2014 | Cypher |
| 8,650,343 | B1 | 2/2014 | Kanapathippillai et al. |
| 8,660,131 | B2 | 2/2014 | Vermunt et al. |
| 8,661,218 | B1 | 2/2014 | Piszczek et al. |
| 8,671,072 | B1 | 3/2014 | Shah et al. |
| 8,689,042 | B1 | 4/2014 | Kanapathippillai et al. |
| 8,700,875 | B1 | 4/2014 | Barron et al. |
| 8,706,694 | B2 | 4/2014 | Chatterjee et al. |
| 8,706,914 | B2 | 4/2014 | Duchesneau |
| 8,706,932 | B1 | 4/2014 | Kanapathippillai et al. |
| 8,712,963 | B1 | 4/2014 | Douglis et al. |
| 8,713,405 | B2 | 4/2014 | Healey et al. |
| 8,719,621 | B1 | 5/2014 | Karmarkar |
| 8,725,730 | B2 | 5/2014 | Keeton et al. |
| 8,751,859 | B2 | 6/2014 | Becker-szendy et al. |
| 8,756,387 | B2 | 6/2014 | Frost et al. |
| 8,762,793 | B2 | 6/2014 | Grube et al. |
| 8,838,541 | B2 | 6/2014 | Camble et al. |
| 8,769,232 | B2 | 7/2014 | Suryabudi et al. |
| 8,775,858 | B2 | 7/2014 | Gower et al. |
| 8,775,868 | B2 | 7/2014 | Colgrove et al. |
| 8,788,913 | B1 | 7/2014 | Xin et al. |
| 8,793,447 | B2 | 7/2014 | Usgaonkar et al. |
| 8,799,746 | B2 | 8/2014 | Baker et al. |
| 8,819,311 | B2 | 8/2014 | Liao |
| 8,819,383 | B1 | 8/2014 | Jobanputra et al. |
| 8,824,261 | B1 | 9/2014 | Miller et al. |
| 8,832,528 | B2 | 9/2014 | Thatcher et al. |
| 8,838,892 | B2 | 9/2014 | Li |
| 8,843,700 | B1 | 9/2014 | Salessi et al. |
| 8,850,108 | B1 | 9/2014 | Hayes et al. |
| 8,850,288 | B1 | 9/2014 | Lazier et al. |
| 8,856,593 | B2 | 10/2014 | Eckhardt et al. |
| 8,856,619 | B1 | 10/2014 | Cypher |
| 8,862,617 | B2 | 10/2014 | Kesselman |
| 8,862,847 | B2 | 10/2014 | Feng et al. |
| 8,862,928 | B2 | 10/2014 | Xavier et al. |
| 8,868,825 | B1 | 10/2014 | Hayes |
| 8,874,836 | B1 | 10/2014 | Hayes |
| 8,880,793 | B2 | 11/2014 | Nagineni |
| 8,880,825 | B2 | 11/2014 | Lionetti et al. |
| 8,886,778 | B2 | 11/2014 | Nedved et al. |
| 8,898,383 | B2 | 11/2014 | Yamamoto et al. |
| 8,898,388 | B1 | 11/2014 | Kimmel |
| 8,904,231 | B2 | 12/2014 | Coatney et al. |
| 8,918,478 | B2 | 12/2014 | Ozzie et al. |
| 8,930,307 | B2 | 1/2015 | Colgrove et al. |
| 8,930,633 | B2 | 1/2015 | Amit et al. |
| 8,943,357 | B2 | 1/2015 | Atzmony |
| 8,949,502 | B2 | 2/2015 | McKnight et al. |
| 8,959,110 | B2 | 2/2015 | Smith et al. |
| 8,959,388 | B1 | 2/2015 | Kuang et al. |
| 8,972,478 | B1 | 3/2015 | Storer et al. |
| 8,972,779 | B2 | 3/2015 | Lee et al. |
| 8,977,597 | B2 | 3/2015 | Ganesh et al. |
| 8,996,828 | B2 | 3/2015 | Kalos et al. |
| 9,003,144 | B1 | 4/2015 | Hayes et al. |
| 9,009,724 | B2 | 4/2015 | Gold et al. |
| 9,021,053 | B2 | 4/2015 | Bernbo et al. |
| 9,021,215 | B2 | 4/2015 | Meir et al. |
| 9,025,393 | B2 | 5/2015 | Wu |
| 9,043,372 | B2 | 5/2015 | Makkar et al. |
| 9,047,214 | B1 | 6/2015 | Sharon et al. |
| 9,053,808 | B2 | 6/2015 | Sprouse |
| 9,058,155 | B2 | 6/2015 | Cepulis et al. |
| 9,063,895 | B1 | 6/2015 | Madnani et al. |
| 9,063,896 | B1 | 6/2015 | Madnani et al. |
| 9,098,211 | B1 | 8/2015 | Madnani et al. |
| 9,110,898 | B1 | 8/2015 | Chamness et al. |
| 9,110,964 | B1 | 8/2015 | Shilane et al. |
| 9,116,819 | B2 | 8/2015 | Cope et al. |
| 9,117,536 | B2 | 8/2015 | Yoon |
| 9,122,401 | B2 | 9/2015 | Zaltsman et al. |
| 9,123,422 | B2 | 9/2015 | Sharon et al. |
| 9,124,300 | B2 | 9/2015 | Olbrich et al. |
| 9,134,908 | B2 | 9/2015 | Horn et al. |
| 9,153,337 | B2 | 10/2015 | Sutardja |
| 9,158,472 | B2 | 10/2015 | Kesselman et al. |
| 9,159,422 | B1 | 10/2015 | Lee et al. |
| 9,164,891 | B2 | 10/2015 | Karamcheti et al. |
| 9,183,136 | B2 | 11/2015 | Kawamura et al. |
| 9,189,650 | B2 | 11/2015 | Jaye et al. |
| 9,201,733 | B2 | 12/2015 | Verma |
| 9,207,876 | B2 | 12/2015 | Shu et al. |
| 9,229,656 | B1 | 1/2016 | Contreras et al. |
| 9,229,810 | B2 | 1/2016 | He et al. |
| 9,235,475 | B1 | 1/2016 | Shilane et al. |
| 9,244,626 | B2 | 1/2016 | Shah et al. |
| 9,250,999 | B1 | 2/2016 | Barroso |
| 9,251,066 | B2 | 2/2016 | Colgrove et al. |
| 9,268,648 | B1 | 2/2016 | Barash et al. |
| 9,268,806 | B1 | 2/2016 | Kesselman et al. |
| 9,286,002 | B1 | 3/2016 | Karamcheti et al. |
| 9,292,214 | B2 | 3/2016 | Kalos et al. |
| 9,298,760 | B1 | 3/2016 | Li et al. |
| 9,304,908 | B1 | 4/2016 | Karamcheti et al. |
| 9,311,969 | B2 | 4/2016 | Murin |
| 9,311,970 | B2 | 4/2016 | Sharon et al. |
| 9,323,663 | B2 | 4/2016 | Karamcheti et al. |
| 9,323,667 | B2 | 4/2016 | Bennett |
| 9,323,681 | B2 | 4/2016 | Apostolides et al. |
| 9,335,942 | B2 | 5/2016 | Kumar et al. |
| 9,348,538 | B2 | 5/2016 | Mallaiah et al. |
| 9,355,022 | B2 | 5/2016 | Ravimohan et al. |
| 9,384,082 | B1 | 7/2016 | Lee et al. |
| 9,384,252 | B2 | 7/2016 | Akirav et al. |
| 9,389,958 | B2 | 7/2016 | Sundaram et al. |
| 9,390,019 | B2 | 7/2016 | Patterson et al. |
| 9,396,202 | B1 | 7/2016 | Drobychev et al. |
| 9,400,828 | B2 | 7/2016 | Kesselman et al. |
| 9,405,478 | B2 | 8/2016 | Koseki et al. |
| 9,411,685 | B2 | 8/2016 | Lee |
| 9,417,960 | B2 | 8/2016 | Klein |
| 9,417,963 | B2 | 8/2016 | He et al. |
| 9,430,250 | B2 | 8/2016 | Hamid et al. |
| 9,430,542 | B2 | 8/2016 | Akirav et al. |
| 9,432,541 | B2 | 8/2016 | Ishida |
| 9,454,434 | B2 | 9/2016 | Sundaram et al. |
| 9,471,579 | B1 | 10/2016 | Natanzon |
| 9,477,554 | B2 | 10/2016 | Chamness et al. |
| 9,477,632 | B2 | 10/2016 | Du |
| 9,501,398 | B2 | 11/2016 | George et al. |
| 9,525,737 | B2 | 12/2016 | Friedman |
| 9,529,542 | B2 | 12/2016 | Friedman et al. |
| 9,535,631 | B2 | 1/2017 | Fu et al. |
| 9,552,248 | B2 | 1/2017 | Miller et al. |
| 9,552,291 | B2 | 1/2017 | Munetoh et al. |
| 9,552,299 | B2 | 1/2017 | Stalzer |
| 9,563,517 | B1 | 2/2017 | Natanzon et al. |
| 9,588,698 | B1 | 3/2017 | Karamcheti et al. |

(56) References Cited

U.S. PATENT DOCUMENTS

| | | | |
|---|---|---|---|
| 9,588,712 | B2 | 3/2017 | Kalos et al. |
| 9,594,652 | B1 | 3/2017 | Sathiamoorthy et al. |
| 9,600,193 | B2 | 3/2017 | Ahrens et al. |
| 9,619,321 | B1 | 4/2017 | Sharon et al. |
| 9,619,430 | B2 | 4/2017 | Kannan et al. |
| 9,645,754 | B2 | 5/2017 | Li et al. |
| 9,667,720 | B1 | 5/2017 | Bent et al. |
| 9,710,535 | B2 | 7/2017 | Aizman et al. |
| 9,733,840 | B2 | 8/2017 | Karamcheti et al. |
| 9,734,225 | B2 | 8/2017 | Akirav et al. |
| 9,740,403 | B2 | 8/2017 | Storer et al. |
| 9,740,700 | B1 | 8/2017 | Chopra et al. |
| 9,740,762 | B2 | 8/2017 | Horowitz et al. |
| 9,747,319 | B2 | 8/2017 | Bestler et al. |
| 9,747,320 | B2 | 8/2017 | Kesselman |
| 9,767,130 | B2 | 9/2017 | Bestler et al. |
| 9,781,227 | B2 | 10/2017 | Friedman et al. |
| 9,785,498 | B2 | 10/2017 | Misra et al. |
| 9,798,486 | B1 | 10/2017 | Singh |
| 9,804,925 | B1 | 10/2017 | Carmi et al. |
| 9,811,285 | B1 | 11/2017 | Karamcheti et al. |
| 9,811,546 | B1 | 11/2017 | Bent et al. |
| 9,818,478 | B2 | 11/2017 | Chung |
| 9,829,066 | B2 | 11/2017 | Thomas et al. |
| 9,836,245 | B2 | 12/2017 | Hayes et al. |
| 9,843,453 | B2 * | 12/2017 | Hayes .................. H04L 9/0891 |
| 9,891,854 | B2 | 2/2018 | Munetoh et al. |
| 9,891,860 | B1 | 2/2018 | Delgado et al. |
| 9,892,005 | B2 | 2/2018 | Kedem et al. |
| 9,892,186 | B2 | 2/2018 | Akirav et al. |
| 9,904,589 | B1 | 2/2018 | Donlan et al. |
| 9,904,717 | B2 | 2/2018 | Anglin et al. |
| 9,952,809 | B2 | 2/2018 | Shah |
| 9,910,748 | B2 | 3/2018 | Pan |
| 9,910,904 | B2 | 3/2018 | Anglin et al. |
| 9,934,237 | B1 | 4/2018 | Shilane et al. |
| 9,940,065 | B2 | 4/2018 | Kalos et al. |
| 9,946,604 | B1 | 4/2018 | Glass |
| 9,959,167 | B1 | 5/2018 | Donlan et al. |
| 9,965,539 | B2 | 5/2018 | D'halluin et al. |
| 9,998,539 | B1 | 6/2018 | Brock et al. |
| 10,007,457 | B2 | 6/2018 | Hayes et al. |
| 10,013,177 | B2 | 7/2018 | Liu et al. |
| 10,013,311 | B2 | 7/2018 | Sundaram et al. |
| 10,019,314 | B2 | 7/2018 | Litsyn et al. |
| 10,019,317 | B2 | 7/2018 | Usvyatsky et al. |
| 10,031,703 | B1 | 7/2018 | Natanzon et al. |
| 10,061,512 | B2 | 8/2018 | Chu et al. |
| 10,073,626 | B2 | 9/2018 | Karamcheti et al. |
| 10,082,985 | B2 | 9/2018 | Hayes et al. |
| 10,089,012 | B1 | 10/2018 | Chen et al. |
| 10,089,174 | B2 | 10/2018 | Lin |
| 10,089,176 | B1 | 10/2018 | Donlan et al. |
| 10,108,819 | B1 | 10/2018 | Donlan et al. |
| 10,146,787 | B2 | 12/2018 | Bashyam et al. |
| 10,152,268 | B1 | 12/2018 | Chakraborty et al. |
| 10,157,098 | B2 | 12/2018 | Chung et al. |
| 10,162,704 | B1 | 12/2018 | Kirschner et al. |
| 10,180,875 | B2 | 1/2019 | Northcott |
| 10,185,730 | B2 | 1/2019 | Bestler et al. |
| 10,235,065 | B1 | 3/2019 | Miller et al. |
| 2002/0144059 | A1 | 10/2002 | Kendall |
| 2003/0105984 | A1 | 6/2003 | Masuyama et al. |
| 2003/0110205 | A1 | 6/2003 | Johnson |
| 2004/0161086 | A1 | 8/2004 | Buntin et al. |
| 2005/0001652 | A1 | 1/2005 | Malik et al. |
| 2005/0076228 | A1 | 4/2005 | Davis et al. |
| 2005/0235132 | A1 | 10/2005 | Karr et al. |
| 2005/0278460 | A1 | 12/2005 | Shin et al. |
| 2005/0283649 | A1 | 12/2005 | Turner et al. |
| 2006/0015683 | A1 | 1/2006 | Ashmore et al. |
| 2006/0114930 | A1 | 6/2006 | Lucas et al. |
| 2006/0174157 | A1 | 8/2006 | Barrall et al. |
| 2006/0248294 | A1 | 11/2006 | Nedved et al. |
| 2007/0079068 | A1 | 4/2007 | Draggon |
| 2007/0214194 | A1 | 9/2007 | Reuter |
| 2007/0214314 | A1 | 9/2007 | Reuter |
| 2007/0234016 | A1 | 10/2007 | Davis et al. |
| 2007/0268905 | A1 | 11/2007 | Baker et al. |
| 2008/0080709 | A1 | 4/2008 | Michtchenko et al. |
| 2008/0107274 | A1 | 5/2008 | Worthy |
| 2008/0155191 | A1 | 6/2008 | Anderson et al. |
| 2008/0295118 | A1 | 11/2008 | Liao |
| 2009/0077208 | A1 | 3/2009 | Nguyen et al. |
| 2009/0138654 | A1 | 5/2009 | Sutardja |
| 2009/0216910 | A1 | 8/2009 | Duchesneau |
| 2009/0216920 | A1 | 8/2009 | Lauterbach et al. |
| 2010/0017444 | A1 | 1/2010 | Chatterjee et al. |
| 2010/0042636 | A1 | 2/2010 | Lu |
| 2010/0094806 | A1 | 4/2010 | Apostolides et al. |
| 2010/0115070 | A1 | 5/2010 | Missimilly |
| 2010/0125695 | A1 | 5/2010 | Wu et al. |
| 2010/0162076 | A1 | 6/2010 | Sim-Tang et al. |
| 2010/0169707 | A1 | 7/2010 | Mathew et al. |
| 2010/0174576 | A1 | 7/2010 | Naylor |
| 2010/0268908 | A1 | 10/2010 | Ouyang et al. |
| 2011/0040925 | A1 | 2/2011 | Frost et al. |
| 2011/0060927 | A1 | 3/2011 | Fillingim et al. |
| 2011/0119462 | A1 | 5/2011 | Leach et al. |
| 2011/0219170 | A1 | 9/2011 | Frost et al. |
| 2011/0238625 | A1 | 9/2011 | Hamaguchi et al. |
| 2011/0264843 | A1 | 10/2011 | Haines et al. |
| 2011/0302369 | A1 | 12/2011 | Goto et al. |
| 2012/0011398 | A1 | 1/2012 | Eckhardt |
| 2012/0079318 | A1 | 3/2012 | Colgrove et al. |
| 2012/0089567 | A1 | 4/2012 | Takahashi et al. |
| 2012/0110249 | A1 | 5/2012 | Jeong et al. |
| 2012/0131253 | A1 | 5/2012 | McKnight |
| 2012/0158923 | A1 | 6/2012 | Mohamed et al. |
| 2012/0191900 | A1 | 7/2012 | Kunimatsu et al. |
| 2012/0198152 | A1 | 8/2012 | Terry et al. |
| 2012/0198261 | A1 | 8/2012 | Brown et al. |
| 2012/0209943 | A1 | 8/2012 | Jung |
| 2012/0226934 | A1 | 9/2012 | Rao |
| 2012/0246435 | A1 | 9/2012 | Meir et al. |
| 2012/0260055 | A1 | 10/2012 | Murase |
| 2012/0311557 | A1 | 12/2012 | Resch |
| 2013/0022201 | A1 | 1/2013 | Glew et al. |
| 2013/0036314 | A1 | 2/2013 | Glew et al. |
| 2013/0042056 | A1 | 2/2013 | Shats |
| 2013/0060884 | A1 | 3/2013 | Bernbo et al. |
| 2013/0067188 | A1 | 3/2013 | Mehra et al. |
| 2013/0073894 | A1 | 3/2013 | Xavier et al. |
| 2013/0124776 | A1 | 5/2013 | Hallak et al. |
| 2013/0132800 | A1 | 5/2013 | Healy et al. |
| 2013/0151653 | A1 | 6/2013 | Sawiki |
| 2013/0151771 | A1 | 6/2013 | Tsukahara et al. |
| 2013/0173853 | A1 | 7/2013 | Ungureanu et al. |
| 2013/0238554 | A1 | 9/2013 | Yucel et al. |
| 2013/0339314 | A1 | 12/2013 | Carpenter et al. |
| 2013/0339635 | A1 | 12/2013 | Amit et al. |
| 2013/0339818 | A1 | 12/2013 | Baker et al. |
| 2014/0040535 | A1 | 2/2014 | Lee |
| 2014/0040702 | A1 | 2/2014 | He et al. |
| 2014/0047263 | A1 | 2/2014 | Coatney et al. |
| 2014/0047269 | A1 | 2/2014 | Kim |
| 2014/0063721 | A1 | 3/2014 | Herman et al. |
| 2014/0064048 | A1 | 3/2014 | Cohen et al. |
| 2014/0068224 | A1 | 3/2014 | Fan et al. |
| 2014/0075252 | A1 | 3/2014 | Luo et al. |
| 2014/0122510 | A1 | 5/2014 | Namkoong et al. |
| 2014/0136880 | A1 | 5/2014 | Shankar et al. |
| 2014/0181402 | A1 | 6/2014 | White |
| 2014/0237164 | A1 | 8/2014 | Le et al. |
| 2014/0279936 | A1 | 9/2014 | Bernbo et al. |
| 2014/0280025 | A1 | 9/2014 | Eidson et al. |
| 2014/0289588 | A1 | 9/2014 | Nagadomi et al. |
| 2014/0330785 | A1 | 11/2014 | Isherwood et al. |
| 2014/0372838 | A1 | 12/2014 | Lou et al. |
| 2014/0380125 | A1 | 12/2014 | Calder et al. |
| 2014/0380126 | A1 | 12/2014 | Yekhanin et al. |
| 2015/0032720 | A1 | 1/2015 | James |
| 2015/0039645 | A1 | 2/2015 | Lewis |
| 2015/0039849 | A1 | 2/2015 | Lewis |

(56) References Cited

U.S. PATENT DOCUMENTS

| | | | |
|---|---|---|---|
| 2015/0089283 | A1 | 3/2015 | Kermarrec et al. |
| 2015/0100746 | A1 | 4/2015 | Rychlik |
| 2015/0134824 | A1 | 5/2015 | Mickens |
| 2015/0153800 | A1 | 6/2015 | Lucas et al. |
| 2015/0180714 | A1 | 6/2015 | Chunn |
| 2015/0280959 | A1 | 10/2015 | Vincent |
| 2016/0246537 | A1 | 2/2016 | Kim |
| 2016/0191508 | A1 | 6/2016 | Bestler et al. |
| 2016/0378612 | A1 | 12/2016 | Hipsh et al. |
| 2017/0091236 | A1 | 3/2017 | Hayes et al. |
| 2017/0103092 | A1 | 4/2017 | Hu et al. |
| 2017/0103094 | A1 | 4/2017 | Hu et al. |
| 2017/0103098 | A1 | 4/2017 | Hu et al. |
| 2017/0103116 | A1 | 4/2017 | Hu et al. |
| 2017/0177236 | A1 | 6/2017 | Haratsch et al. |
| 2018/0039442 | A1 | 2/2018 | Shadrin et al. |
| 2018/0081958 | A1 | 3/2018 | Akirav et al. |
| 2018/0101441 | A1 | 4/2018 | Hyun et al. |
| 2018/0101587 | A1 | 4/2018 | Anglin et al. |
| 2018/0101588 | A1 | 4/2018 | Anglin et al. |
| 2018/0217756 | A1 | 8/2018 | Liu et al. |
| 2018/0307560 | A1 | 10/2018 | Vishnumolakala et al. |
| 2018/0321874 | A1 | 11/2018 | Li et al. |
| 2019/0036703 | A1 | 1/2019 | Bestler |

FOREIGN PATENT DOCUMENTS

| | | |
|---|---|---|
| WO | WO 02-13033 | 2/2002 |
| WO | WO 2008103569 | 8/2008 |
| WO | WO 2008157081 | 12/2008 |
| WO | WO 2013032825 | 7/2013 |

OTHER PUBLICATIONS

Schmid, Patrick: "RAID Scaling Charts, Part 3:4-128 kB Stripes Compared", Tom's Hardware, Nov. 27, 2007 (http://www.tomshardware.com/reviews/RAID-SCALING-CHARTS.1735-4.html), See pp. 1-2.

Storer, Mark W. et al., "Pergamum: Replacing Tape with Energy Efficient, Reliable, Disk-Based Archival Storage," Fast '08: 6th USENIX Conference on File and Storage Technologies, San Jose, CA, Feb. 26-29, 2008 pp. 1-16.

Ju-Kyeong Kim et al., "Data Access Frequency based Data Replication Method using Erasure Codes in Cloud Storage System", Journal of the Institute of Electronics and Information Engineers, Feb. 2014, vol. 51, No. 2, pp. 85-91.

International Search Report and the Written Opinion of the International Searching Authority, PCT/US2015/018169, dated May 15, 2015.

International Search Report and the Written Opinion of the International Searching Authority, PCT/US2015/034302, dated Sep. 11, 2015.

International Search Report and the Written Opinion of the International Searching Authority, PCT/US2015/039135, dated Sep. 18, 2015.

International Search Report and the Written Opinion of the International Searching Authority, PCT/US2015/039136, dated Sep. 23, 2015.

International Search Report, PCT/US2015/039142, dated Sep. 24, 2015.

International Search Report, PCT/US2015/034291, dated Sep. 30, 2015.

International Search Report and the Written Opinion of the International Searching Authority, PCT/US2015/039137, dated Oct. 1, 2015.

International Search Report, PCT/US2015/044370, dated Dec. 15, 2015.

International Search Report amd the Written Opinion of the International Searching Authority, PCT/US2016/031039, dated May 5, 2016.

International Search Report, PCT/US2016/014604, dated May 19, 2016.

International Search Report, PCT/US2016/014361, dated May 30, 2016.

International Search Report, PCT/US2016/014356, dated Jun. 28, 2016.

International Search Report, PCT/US2016/014357, dated Jun. 29, 2016.

International Seach Report and the Written Opinion of the International Searching Authority, PCT/US2016/016504, dated Jul. 6, 2016.

International Seach Report and the Written Opinion of the International Searching Authority, PCT/US2016/024391, dated Jul. 12, 2016.

International Seach Report and the Written Opinion of the International Searching Authority, PCT/US2016/026529, dated Jul. 19, 2016.

International Seach Report and the Written Opinion of the International Searching Authority, PCT/US2016/023485, dated Jul. 21, 2016.

International Seach Report and the Written Opinion of the International Searching Authority, PCT/US2016/033306, dated Aug. 19, 2016.

International Seach Report and the Written Opinion of the International Searching Authority, PCT/US2016/047808, dated Nov. 25, 2016.

Stalzer, Mark A., "FlashBlades: System Architecture and Applications," Proceedings of the 2nd Workshop on Architectures and Systems for Big Data, Association for Computing Machinery, New York, NY, 2012, pp. 10-14.

International Seach Report and the Written Opinion of the International Searching Authority, PCT/US2016/042147, dated Nov. 30, 2016.

* cited by examiner

STORAGE SYSTEM COMMUNICATION

BACKGROUND

Solid-state memory, such as flash, is currently in use in solid-state drives (SSD) to augment or replace conventional hard disk drives (HDD), writable CD (compact disk) or writable DVD (digital versatile disk) drives, collectively known as spinning media, and tape drives, for storage of large amounts of data. Flash and other solid-state memories have characteristics that differ from spinning media. Yet, many solid-state drives are designed to conform to hard disk drive standards for compatibility reasons, which makes it difficult to provide enhanced features or take advantage of unique aspects of flash and other solid-state memory. In a storage cluster environment, it may be difficult to verify communications between storage nodes, or such verification may consume excessive communication bandwidth between storage nodes.

It is within this context that the embodiments arise.

SUMMARY

In some embodiments, a method for authorizing I/O (input/output) commands in a storage cluster is provided. The method includes generating a token responsive to an authority initiating an I/O command, wherein the token is specific to assignment of the authority and a storage node of the storage cluster. The method includes verifying the I/O command using the token, wherein the token includes a signature confirming validity of the token and wherein the token is revocable.

In some embodiments, a storage cluster that authorizes I/O (input/output) commands with I/O tokens is provided. The storage cluster includes a plurality of storage nodes coupled to form the storage cluster. Each of the plurality of storage nodes has one or more storage units and each of the one or more storage units has random-access memory (RAM) and non-volatile solid-state storage memory. At least a subset of the plurality of storage nodes has one or more authorities configured to issue I/O commands and generate tokens, wherein a token accompanies each I/O command. The token is specific to an authority issuing the I/O command and specific to the storage node having the authority. Each of the one or more storage units is configured to verify the I/O commands using the token. The token includes a signature confirming validity of the token and the token is revocable.

In some embodiments, a storage node that authorizes I/O (input/output) commands in a storage cluster is provided. The storage node includes a processor and one or more storage units having random-access memory (RAM) and non-volatile solid-state storage memory. The processor of the storage node is configured to issue an I/O command with a token on behalf of an authority in the storage node, wherein the token is specific to the storage node and the authority, the token has a signature confirming validity of the token and wherein the token is revocable.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
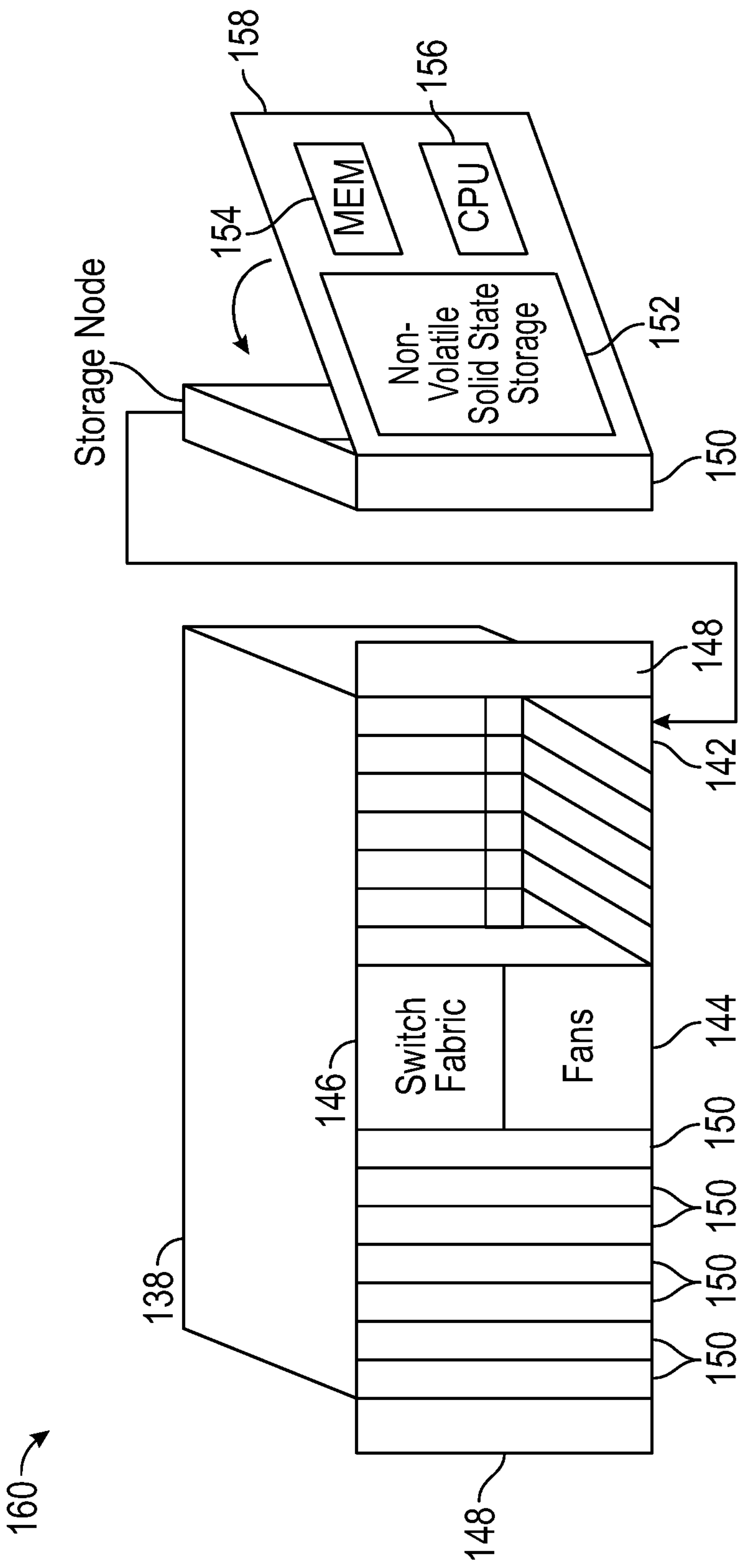
FIG. 1 is a perspective view of a storage cluster with multiple storage nodes and internal storage coupled to each storage node to provide network attached storage, in accordance with some embodiments.

The embodiments below describe a storage cluster that stores user data, such as user data originating from one or more user or client systems or other sources external to the storage cluster. The storage cluster distributes user data across storage nodes housed within a chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster is contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as Peripheral Component Interconnect (PCI) Express, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system (NFS), common internet file system (CIFS), small computer system interface (SCSI) or hypertext transfer protocol (HTTP). Translation from the client protocol may occur at the switch, chassis external communication bus or within each storage node.

Each storage node may be one or more storage servers and each storage server is connected to one or more non-volatile solid state memory units, which may be referred to as storage units. One embodiment includes a single storage server in each storage node and between one to eight non-volatile solid state memory units, however this one example is not meant to be limiting. The storage server may include a processor, dynamic random access memory (DRAM) and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded central processing unit (CPU), solid state storage controller, and a quantity of solid state mass storage, e.g., between 2-32 terabytes (TB) in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory (MRAM) that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

FIG. 1 is a perspective view of a storage cluster 160, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 160, each having one or more storage nodes 150, in a flexible and reconfigurable arrangement of both the physical components and the amount of storage memory provided thereby. The storage cluster 160 is designed to fit in a rack, and one or more racks can be set up and populated as desired for the storage memory. The storage cluster 160 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in FIG. 1, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 158 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 1, storage cluster 160 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2:
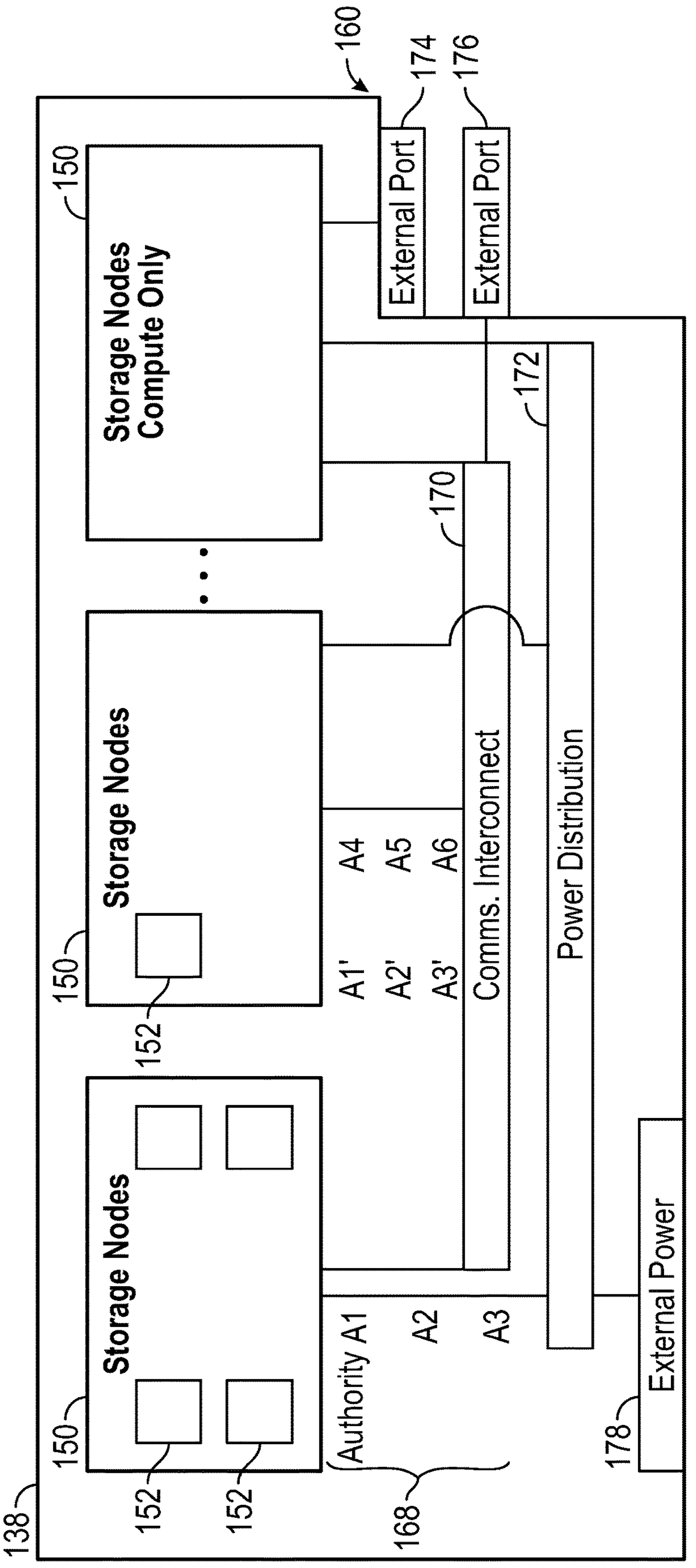
FIG. 2 is a block diagram showing an interconnect switch coupling multiple storage nodes in accordance with some embodiments.

FIG. 2 is a block diagram showing a communications interconnect 170 and power distribution bus 172 coupling multiple storage nodes 150. Referring back to FIG. 1, the communications interconnect 170 can be included in or implemented with the switch fabric 146 in some embodiments. Where multiple storage clusters 160 occupy a rack, the communications interconnect 170 can be included in or implemented with a top of rack switch, in some embodiments. As illustrated in FIG. 2, storage cluster 160 is enclosed within a single chassis 138. External port 176 is coupled to storage nodes 150 through communications interconnect 170, while external port 174 is coupled directly to a storage node. External power port 178 is coupled to power distribution bus 172. Storage nodes 150 may include varying amounts and differing capacities of non-volatile solid state storage 152 as described with reference to FIG. 1. In addition, one or more storage nodes 150 may be a compute only storage node as illustrated in FIG. 2. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 1 and 2, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIG. 5) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Modes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check (LDPC) code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing (RUSH) family of hashes, including Controlled Replication Under Scalable Hashing (CRUSH). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 3:
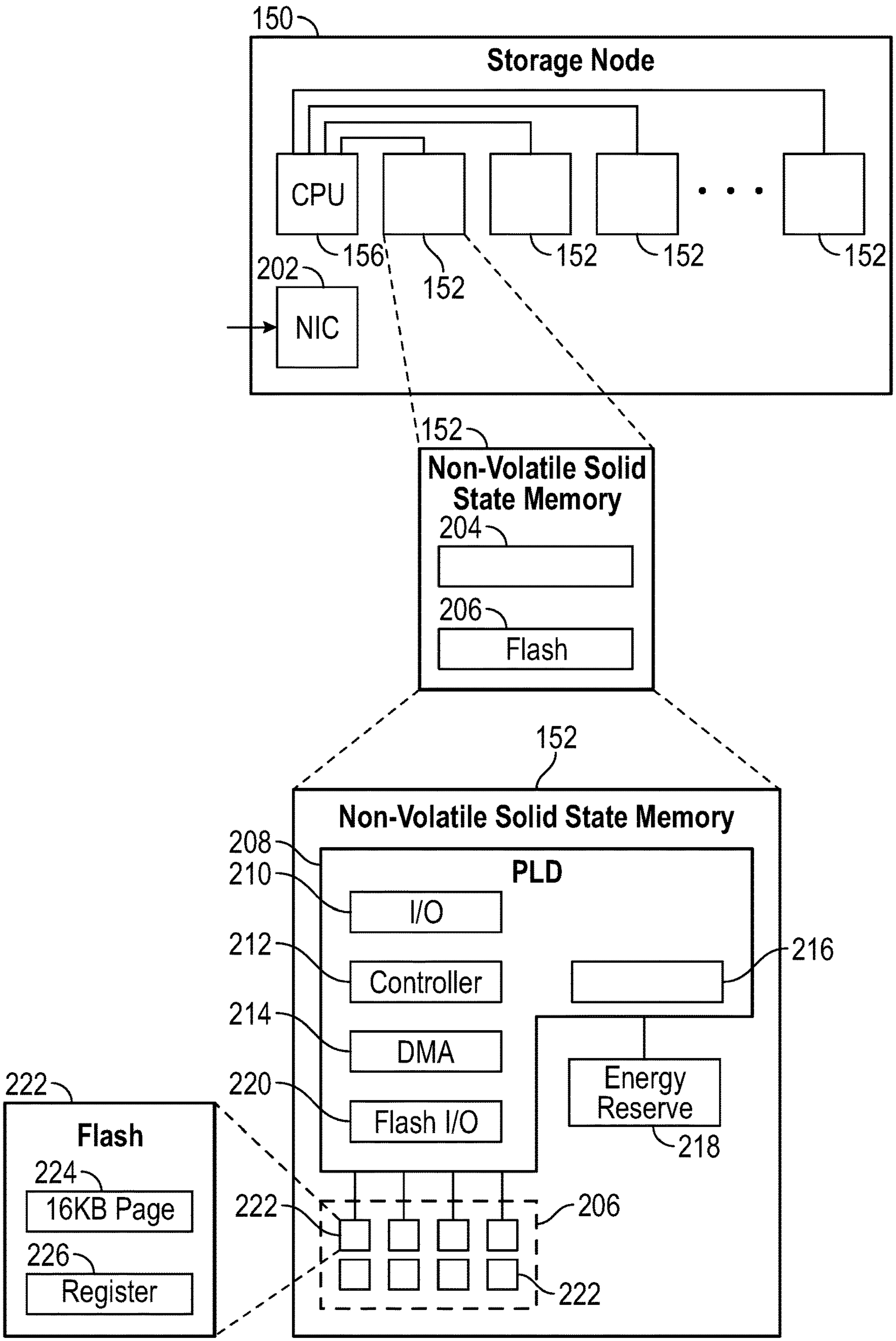
FIG. 3 is a multiple level block diagram, showing contents of a storage node and contents of one of the non-volatile solid state storage units in accordance with some embodiments.

FIG. 3 is a multiple level block diagram, showing contents of a storage node 150 and contents of a non-volatile solid state storage 152 of the storage node 150. Data is communicated to and from the storage node 150 by a network interface controller (NIC) 202 in some embodiments. Each storage node 150 has a CPU 156, and one or more non-volatile solid state storage 152, as discussed above. Moving down one level in FIG. 3, each non-volatile solid state storage 152 has a relatively fast non-volatile solid state memory, such as nonvolatile random access memory (NVRAM) 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 3, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e.

multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device (PLD) 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 160, in various embodiments as disclosed herein, can be contrasted with storage arrays in general. The storage nodes 150 are part of a collection that creates the storage cluster 160. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 160, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 4:
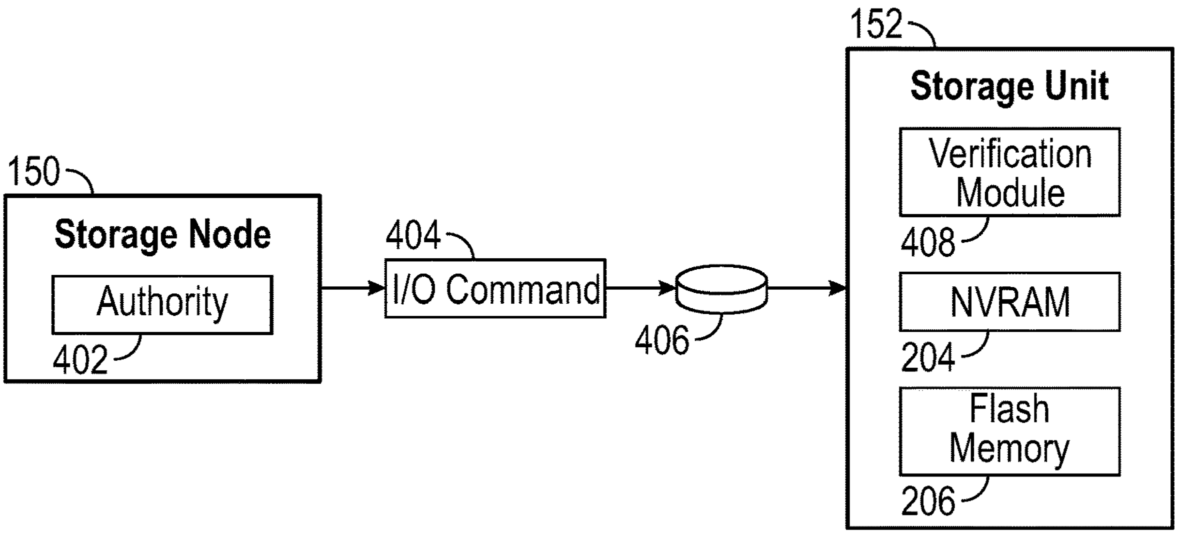
FIG. 4 depicts a storage node sending an I/O command to a storage unit, which verifies the I/O command based on contents of an accompanying signed token in accordance with some embodiments.

FIG. 4 depicts a storage node 150 sending an I/O command 404 to a storage unit 152, which verifies the I/O command 404 based on contents of an accompanying signed token 406. The I/O command 404 could be a command to read data from, or write data to the storage unit 152, e.g. involving the flash memory 206 or the NVRAM 204, or some other command. In some embodiments, the I/O command 404 could be a command to read or write data that is striped across the storage units 152 in the storage cluster 160. A signed token 406 accompanies or is associated with the I/O command 404. In some embodiments, the storage node 150 could send the I/O command 404 and the signed token 406, on behalf of the authority 402, to the storage unit 152 via the communications interconnect 170 shown in FIG. 2. Upon receiving the I/O command 404 and the associated signed token 406, the storage unit 152 verifies the I/O command 404, based on contents of the token 406. A verification module 408 in the storage unit 152 performs this verification, and can be implemented as software, firmware, hardware, or combinations thereof. In some embodiments, the storage unit 152, using the verification module 408, determines the contents of the token 406 and verifies the I/O command 404 without further communication from the storage unit 152 back to originators of the token 406 and the signature, i.e., without communicating to other storage nodes 150. As described further below, the token may be revocable with or without requiring further communication from the storage unit 152.

Figure 5:
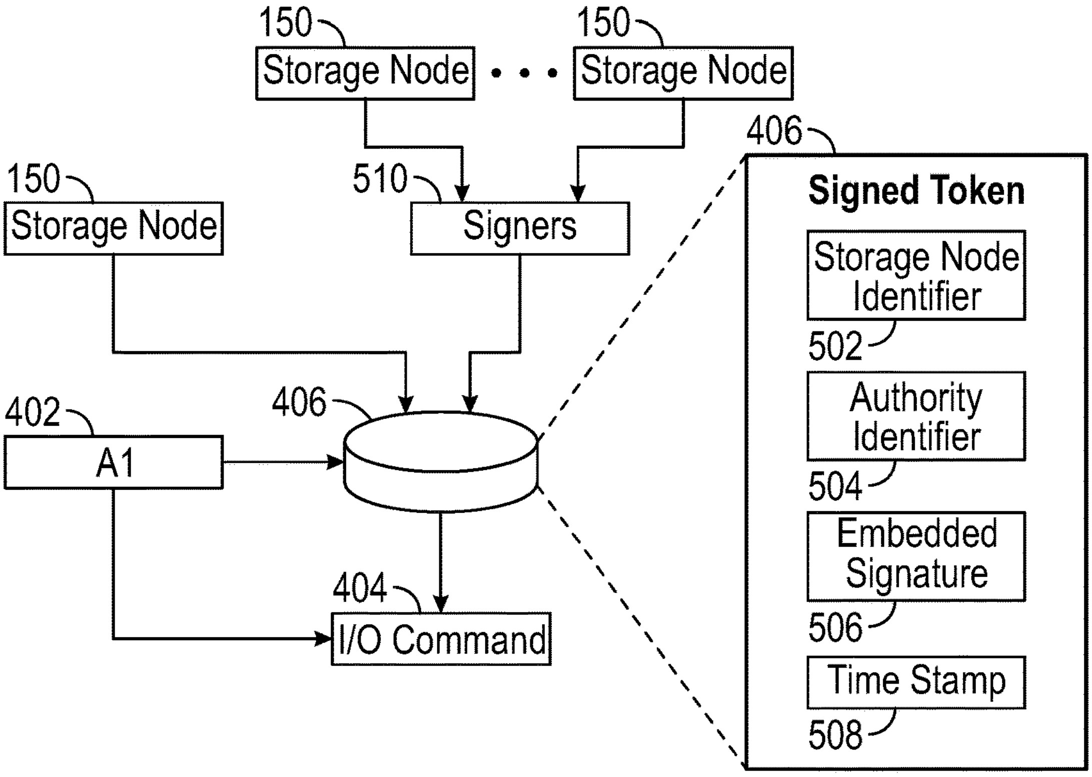
FIG. 5 shows relationships of the token to the I/O command, the storage node, the authority executing in the storage node, and signers of the token in accordance with some embodiments.

FIG. 5 shows relationships of the token 406 to the I/O command 404, the storage node 150, the authority 402 executing in the storage node 150, and signers 510 of the token 406 in some embodiments. Contents of the signed token 406, in one embodiment as depicted, include a storage node identifier 502, an authority identifier 504, an embedded signature 506, and a timestamp 508. Each token 406 is specific to an authority 402 and specific to the storage node 150 in which the authority 402 resides or executes. The storage node identifier 502, in the token 406, could be a number or a name identifying the storage node 150 in some embodiments. Similarly, the authority identifier 504 in the token 406 could be a number or name identifying the authority 402. For example, the authority 402 issuing the I/O command 404 in FIG. 5 is labeled (e.g., named) "A1", and this name could be used as the authority identifier 504.

Still referring to FIG. 5, storage nodes 150, other than the storage node executing the authority 402, are signers 510 of the token 406 in some embodiments. Each of the signers 510 is a storage node 150 or on authority 402, in various embodiments, and the signers 510 are spread across or distributed among the storage nodes 150 of the storage cluster 160. These signers 510 provide a signature (which could include multiple signatures, in one embodiment), which is then embedded in the token 406. Signing algorithms, signing mechanisms, signatures and embedded signatures are well known, and suitable versions of these can be selected and applied in various embodiments. By signing the token 406, the signers 510 are indicating that they agree that the authority 402 has ownership of data affected by the I/O command 404. This agreement can be formed by a voting arrangement, among other possibilities. The timestamp 508 in the token 406 could indicate the time of creation of the token 406, the time of signing of the token 406, the time of sending of the token 406, or some other time value associated with the I/O command 404. There is a predefined validity time period or interval for the timestamp 508, commencing when the timestamp 508 is written (i.e., commencing with the value of the timestamp 508) in some embodiments. The validity time for the token 406 expires at the end of the validity time period or interval. Thus, upon expiration of the validity time period token 406 is revoked. In some embodiments, token 406 may be revoked through alternative mechanisms, e.g., under direction of a storage node. It should be appreciated that the embodiments covers instances where the token 406 may be revoked with or without the need for communication to or from any storage nodes. In addition, while the embodiments provide one example where the token is revoked through a shared system feature such as time to avoid the need for any external communication concerning the revocation, other shared system features may be integrated with the embodiments.

Referring back to FIG. 4, and with ongoing reference to FIG. 5, the verification module 408 checks the embedded signature 506 of the token 406. For example, the embedded signature 506 could be encrypted, and the verification module 408 could decrypt the embedded signature 506 and compare the decrypted value to an expected value. In some embodiments, the verification module 408 could decrypt the embedded signature 506, and compare the decrypted value to the storage node identifier 502 and the authority identifier 504, looking for a match. The verification module 408 also checks the timestamp 508, and looks to see if the token has expired, e.g., compares the present time value to the timestamp 508 and the validity time period or interval. The verification module 408 can thus determine whether the I/O command 404 is valid, based on whether the authority 402 and the storage node 150 have a right to issue I/O commands 404 pertaining to the data to be written to or read from the storage unit 152, whether the token 406 is properly signed, and whether the token 406 is within the validity time period or interval or has expired and is revoked. It should be appreciated that while the embodiments refer to a revocable token where the revocation is achieved without any external communication to or from any storage nodes, this is not meant to be limiting. In some embodiments, the token may be revoked through a mechanism requiring the external communication.

Figure 6:
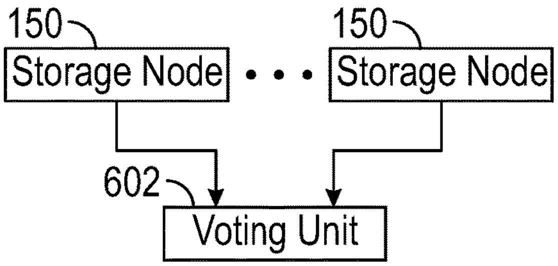
FIG. 6 shows storage nodes voting to replace an authority in accordance with some embodiments.

FIG. 6 shows storage nodes 150 voting to replace an authority 402 in some embodiments. Such voting could take place if a storage node 150, or an authority 402, is unresponsive. Under these circumstances, the storage cluster 160 continues to operate, as will be described with reference to FIG. 7. In the embodiment shown in FIG. 6, the storage nodes 150 are coupled to a voting unit 602. Voting mechanisms, algorithms and connections are well known, and suitable versions of these can be selected and applied in various embodiments. For example, the voting unit 602 could be distributed and redundant across the storage nodes 150, so that the storage cluster 160 has a type of fault tolerance and can vote when one or more storage nodes 150 are unresponsive. The voting unit 602 is utilized by the signers 510 to determine whether or not a token 406 should be signed, in some embodiments. The storage nodes from which the embedded signature 506 for the signed token 406 originates form a witness quorum within the storage cluster 160. In some embodiments, the quorum of signers represents a majority of the plurality of storage nodes.

Figure 7:
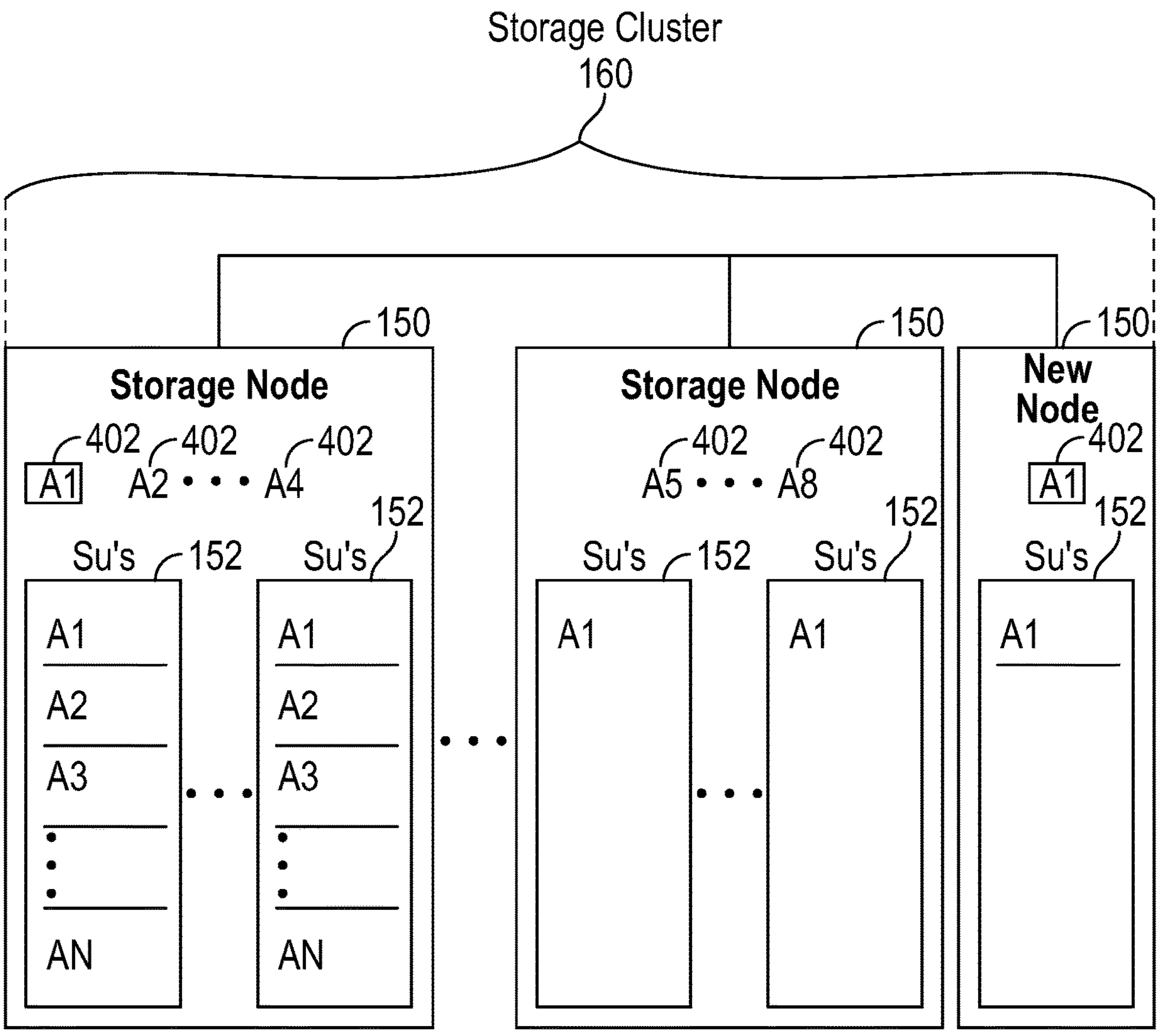
FIG. 7 shows assignment of an authority to a new storage node, as a replacement authority in accordance with some embodiments.

FIG. 7 shows assignment of an authority 402 to a new storage node 150, as a replacement authority 402. Continuing with the scenario developed in FIGS. 4-6, the left-most storage node 150 is shown with authorities 402 named A1, A2 . . . A4, and the middle storage node 150 is shown as having authorities 402 named A5 . . . A8. User data corresponding with (e.g., owned by) the authority 402 named A1 is depicted as striped across the storage units 152 (e.g., data labeled "A1" in each of the storage units 152), using erasure coding. Some of the storage units 152 show user data corresponding to other authorities, such as A2 . . . AN. In this scenario, the authority 402 named "A1", or the storage node 150 that is executing this authority 402, is unresponsive or unreachable. However, the storage cluster still needs to access the user data owned by this authority 402. The remaining storage nodes 150 vote, using the voting unit 602 of FIG. 6, to replace the authority 402 named "A1", i.e., to determine a replacement authority 402. The remaining storage nodes 150 determine that a new node 150 is a suitable location to which to relocate the authority 402 named "A1". The new storage node 150 could be an unused (e.g., spare, not yet allocated) storage node 150, or a storage node 150 that is currently in use and has one or more other authorities 402. The authority 402 is then relocated to the new storage node 150, i.e., the replacement authority 402 is located in the new storage node 150, and given ownership of the user data (formerly) owned by the original authority 402 that is unresponsive or is located in an unresponsive storage node 150. The relocated or replacement authority 402, in the new storage node 150, is depicted as owning the data corresponding to the authority 402 named "A1" (see arrow pointing from replacement authority 402 to corresponding user data in the storage unit 152 in the new storage node 150). This relocated or replacement authority 402 can issue I/O commands 404, with signed tokens 406, pertaining to the user data over which it now has ownership. The new storage node 150 thus acts as a replacement storage node 150, and the relocated authority 402 acts as a replacement authority 402. It should be appreciated that the user data itself does not need to be moved during this process, and remains intact in the storage units 152. When an authority 402 is relocated or replaced, the remaining storage nodes 150 can vote, using the voting unit 602, to revoke any or all tokens 406 issued by (or on behalf of) the authority 402 prior to relocation or replacement in some embodiments. Revocation could be carried out by sending messages to the various storage units 152, so that the verification modules 408 are made aware of which tokens 406 are revoked. The remaining storage nodes 150 can vote to block communication from an authority 402 being replaced, in some embodiments.

Figure 8:
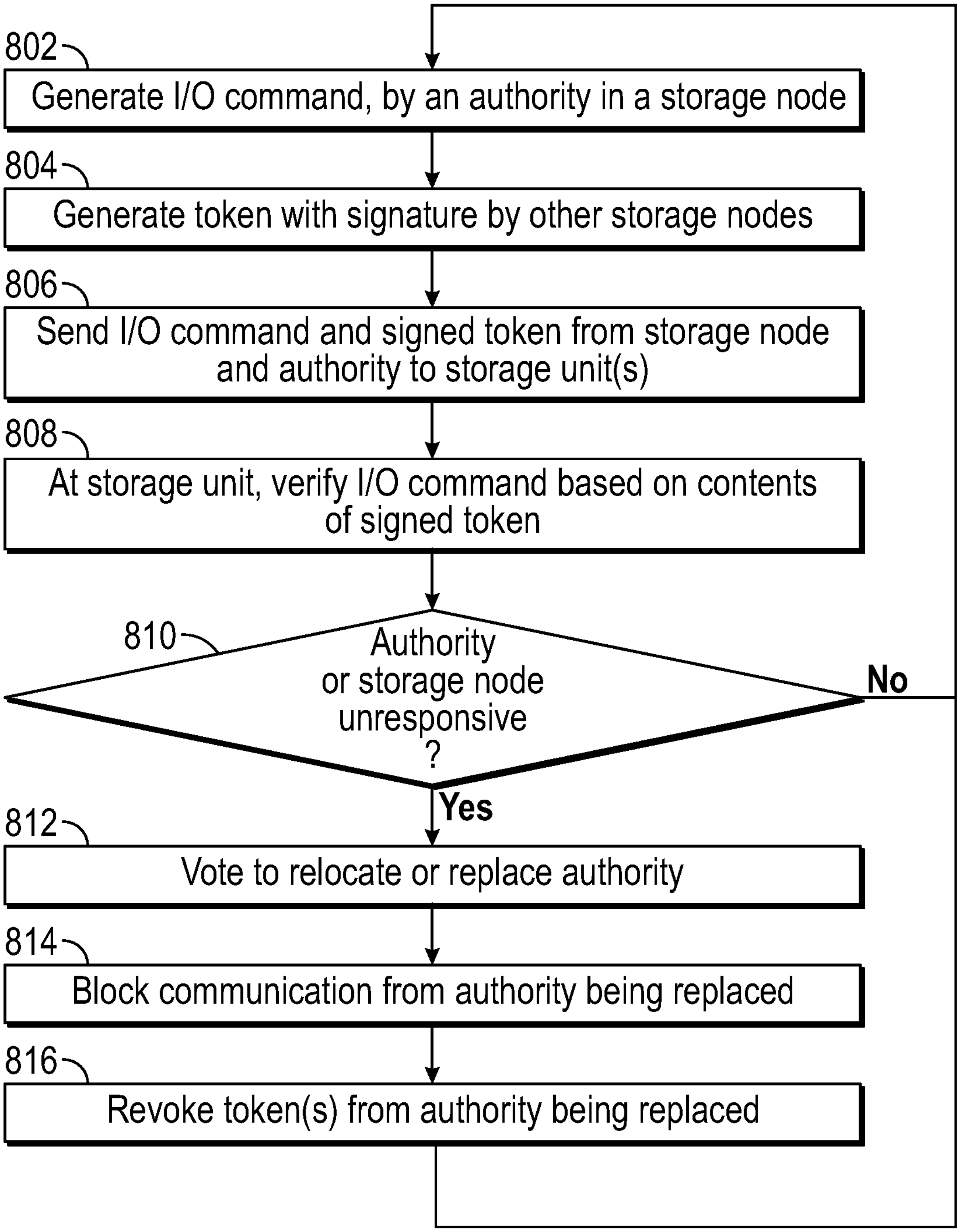
FIG. 8 is a flow diagram of a method for authorizing I/O commands, which can be practiced in the storage cluster of FIG. 1 in accordance with some embodiments.

FIG. 8 is a flow diagram of a method for authorizing I/O commands, which can be practiced in the storage cluster of FIG. 1 and further embodiments thereof. Some or all of the actions in the method can be performed by various processors, such as processors in storage nodes or processors in storage units. In an action 802, an I/O command is generated by an authority in a storage node. For example, the processor in a storage node could generate an I/O command on behalf of an authority resident or executing in the storage node. The I/O command could pertain to data striped across storage units in the storage cluster, or data in NVRAM in a storage unit in some embodiments. In an action 804, a token is generated responsive to the authority initiating the I/O command and the token is associated with the I/O command. The token is specific to assignment of the authority and a storage node of the storage cluster. The token has a signature by storage nodes other than the storage node that has the authority for which the I/O command is generated in some embodiments. The token may have a timestamp, an authority identifier and/or a storage node identifier, among various possibilities as discussed above.

Still referring to FIG. 8, the I/O command and the signed token are sent from the storage node and authority to one or more storage units, in an action 806. These could be sent as messages in some embodiments. The I/O command is verified based on contents of the signed token in action 808, e.g., a signature confirming validity of the token. This verification could include checking to see if the time of receipt of the signed token is within a predetermined time validity period or interval of a timestamp in the signed token, checking the signature to confirm validity of the token, and so on. As noted above, the token is revocable and in some embodiments the token may be self-revoking, e.g., based on a time expiration as discussed above. The I/O command is performed by the storage unit, upon successful verification. In a decision action 810, it is determined whether an authority or a storage node is unresponsive or unreachable. If none of the authorities or storage nodes is unresponsive or unreachable, flow branches back to the action 802, for more I/O commands and repeats as described above. If an authority or a storage node is unresponsive, flow proceeds to the action 812. In the action 812, there is a vote to relocate or replace such an authority. Relocating or replacing an authority can be performed as discussed above with reference to FIG. 7 in some embodiments. Communication from the authority being replaced is blocked, in an action 814. One or more tokens from the authority being replaced are revoked, in an action 816. The revocation of the one or more tokens may be without any further external communication to or from the storage nodes or storage units in some embodiments, as discussed above. Flow then proceeds back to the action 802, to generate an I/O command (by one of the existing authorities, and/or by the relocated or replacement authority).

Figure 9:
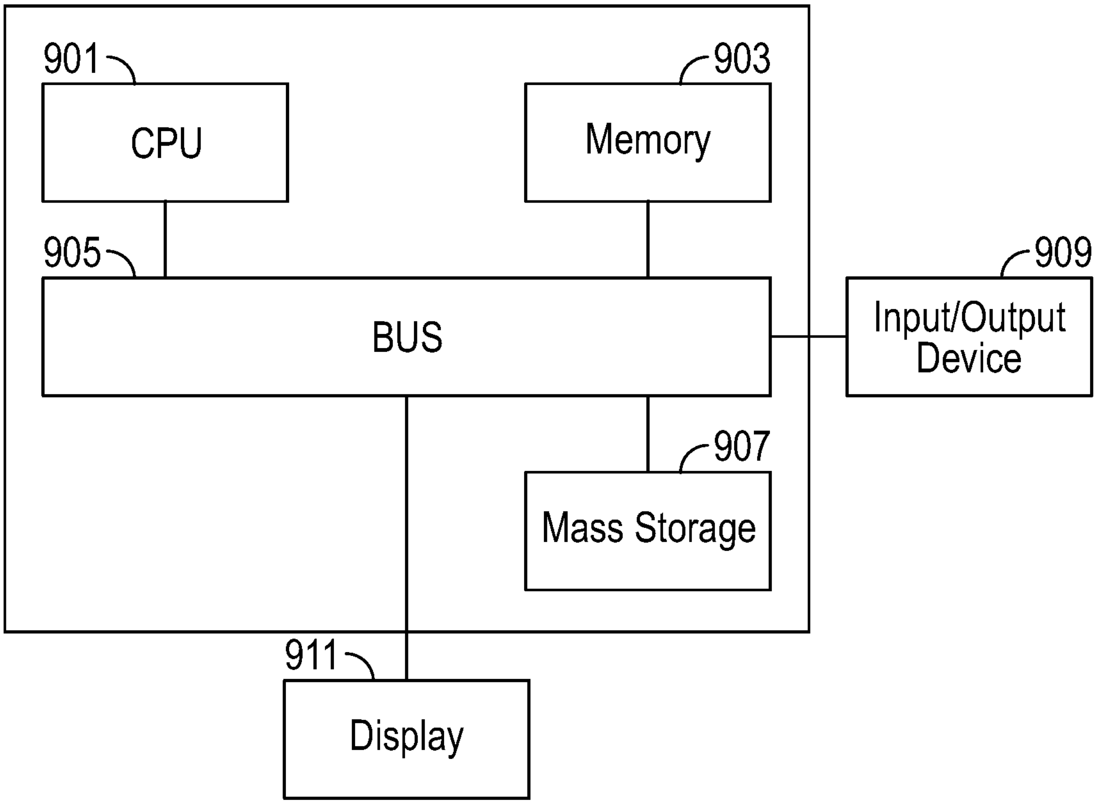
FIG. 9 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 9 is an illustration showing an exemplary computing device which may implement the embodiments described herein. The computing device of FIG. 9 may be used to perform embodiments of the functionality for a storage node or a non-volatile solid state storage in accordance with some embodiments. The computing device includes a central processing unit (CPU) 901, which is coupled through a bus 905 to a memory 903, and mass storage device 907. Mass storage device 907 represents a persistent data storage device such as a disc drive, which may be local or remote in some embodiments. The mass storage device 907 could implement a backup storage, in some embodiments. Memory 903 may include read only memory, random access memory, etc. Applications resident on the computing device may be stored on or accessed via a computer readable medium such as memory 903 or mass storage device 907 in some embodiments. Applications may also be in the form of modulated electronic signals modulated accessed via a network modem or other network interface of the computing device. It should be appreciated that CPU 901 may be embodied in a general-purpose processor, a special purpose processor, or a specially programmed logic device in some embodiments.

Display 911 is in communication with CPU 901, memory 903, and mass storage device 907, through bus 905. Display 911 is configured to display any visualization tools or reports associated with the system described herein. Input/output device 909 is coupled to bus 905 in order to communicate information in command selections to CPU 901. It should be appreciated that data to and from external devices may be communicated through the input/output device 909. CPU 901 can be defined to execute the functionality described herein to enable the functionality described with reference to FIGS. 1-8. The code embodying this functionality may be stored within memory 903 or mass storage device 907 for execution by a processor such as CPU 901 in some embodiments. The operating system on the computing device may be MS-WINDOWS™, UNIX™, LINUX™, iOS™, CentOS™, Android™, Redhat Linux™, z/OS™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A storage cluster, comprising:

a plurality of storage nodes coupled to form the storage cluster;

each of the plurality of storage nodes having one or more storage units;

each of the one or more storage units having non-volatile solid-state storage memory;

at least a subset of the plurality of storage nodes having one or more authorities configured to issue I/O commands and generate tokens, wherein a token accompanies each I/O command, the token specific to an authority issuing the I/O command and specific to the storage node having the authority.

2. The storage cluster of claim 1, wherein the token is revoked by exceeding a time interval associated with the token.

3. The storage cluster of claim 1, wherein a signature is associated with a subset of the plurality of storage nodes and wherein the subset of the plurality of storage nodes represents a quorum of signers of the token.

4. The storage cluster of claim 3, wherein the quorum of signers represents a majority of the plurality of storage nodes.

5. The storage cluster of claim 1, wherein a signature is associated with one or more signers distributed across the plurality of storage nodes.

6. The storage cluster of claim 1, wherein the I/O commands pertain to one of data to be written to non-volatile random-access memory (NVRAM) or data to be written to or read from a data stripe across a plurality of storage units.

7. A method comprising:

generating a token responsive to an authority initiating an I/O command, wherein the token is specific to assignment of the authority and a storage node of the storage cluster; and verifying the I/O command using the token, wherein the token includes a signature confirming validity of the token and wherein the token is revocable.

8. The method of claim 7, wherein the token is revoked by exceeding a time interval associated with the token.

9. The method of claim 7, wherein the signature is associated with a plurality of storage nodes and wherein the plurality of storage nodes represents a quorum of signers of the token.

10. The method of claim 9 wherein the quorum of signers represents a majority of the plurality of storage nodes.

11. The method of claim 7, wherein the signature is associated with one or more signers spread across a plurality of storage nodes of the storage cluster.

12. The method of claim 7, further comprising:

voting to reassign the storage node that is executing the authority;

establishing the authority in one of a plurality of storage nodes differing from the storage node that is being reassigned.

13. The method of claim 7, wherein the I/O command pertains to one of data to be written to non-volatile random-access memory (NVRAM) or data to be written to or read from a data stripe across a plurality of storage units.

14. A storage node comprising:

a processor;

one or more storage units having non-volatile solid-state storage memory;

the processor of the storage node configured to issue an I/O command with a token on behalf of an authority in the storage node, wherein the token is specific to the storage node and the authority.

15. The storage node of claim 14, wherein the token is revoked by exceeding a time interval associated with the token.

16. The storage node of claim 14, wherein the signature is associated with a plurality of storage nodes in the storage cluster and wherein the plurality of storage nodes represents a quorum of signers of the token.

17. The storage node of claim 16, wherein the quorum of signers represents a majority of the plurality of storage nodes.

18. The storage node of claim 14, wherein the signature is associated with one or more signers distributed across the plurality of storage nodes.

19. The storage node of claim 14, wherein other storage nodes of the storage cluster are configured to vote to reassign the storage node that is executing the authority and establish the authority in one of the other storage nodes.

20. The storage node of claim 14, wherein the I/O commands pertain to one of data to be written to non-volatile random-access memory (NVRAM) or data to be written to or read from a data stripe across a plurality of storage units.

* * * * *